(12) United States Patent
Jacobson

(10) Patent No.: US 11,720,989 B2
(45) Date of Patent: Aug. 8, 2023

(54) SYSTEMS AND METHODS FOR GENERATING DEVICE-IDENTIFYING DIGITAL CONTENT ON SOCIAL MEDIA PLATFORMS

(71) Applicant: META PLATFORMS TECHNOLOGIES, LLC, Menlo Park, CA (US)

(72) Inventor: Matthew F. Jacobson, Walnut, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 233 days.

(21) Appl. No.: 16/953,570

(22) Filed: Nov. 20, 2020

(65) Prior Publication Data
US 2022/0148121 A1    May 12, 2022

Related U.S. Application Data

(60) Provisional application No. 63/110,835, filed on Nov. 6, 2020.

(51) Int. Cl.
*G06T 1/00* (2006.01)
*G06F 21/16* (2013.01)
*G06F 16/9536* (2019.01)

(52) U.S. Cl.
CPC ........ *G06T 1/0021* (2013.01); *G06F 16/9536* (2019.01); *G06F 21/16* (2013.01)

(58) Field of Classification Search
CPC ... G06T 1/0021; G06F 16/9536; G06F 21/16; H04N 21/47205; H04N 21/4788; H04N 21/8352; H04N 21/2743
See application file for complete search history.

(56) References Cited

U.S. PATENT DOCUMENTS

| 9,372,927 B1 | 6/2016 | Fredinburg et al. |
| 2009/0319910 A1 | 12/2009 | Escapa et al. |
| 2011/0246569 A1* | 10/2011 | Tiu, Jr. ............... G06F 16/958 709/203 |
| 2013/0054772 A1 | 2/2013 | Sung et al. |

(Continued)

OTHER PUBLICATIONS

International Search Report and Written Opinion for International Application No. PCT/US2021/056390, dated Feb. 11, 2022, 11 pages.

(Continued)

*Primary Examiner* — Mohammad W Reza
(74) *Attorney, Agent, or Firm* — Greenberg Traurig, LLP

(57) ABSTRACT

A computer-implemented method for generating device-identifying digital content on social media platforms may include (i) identifying digital content created by a content-creation device for display on a social media platform, (ii) modifying the digital content to indicate that the digital content was created by the content-creation device such that, when the modified digital content is displayed on the social media platform, the modified digital content identifies the content-creation device as the source of the digital content, and (iii) displaying, on the social media platform, the modified digital content to enable users of the social media platform to identify the content-creation device as the source of the digital content. Various other methods, systems, and computer-readable media are also disclosed.

20 Claims, 10 Drawing Sheets

(56) References Cited

U.S. PATENT DOCUMENTS

| | | | |
|---|---|---|---|
| 2013/0124596 A1 | 5/2013 | Damman et al. | |
| 2015/0350259 A1* | 12/2015 | Garg | G06Q 10/10 709/203 |
| 2016/0191975 A1* | 6/2016 | Ju | H04N 21/85406 725/115 |
| 2016/0300594 A1* | 10/2016 | Allen | G11B 27/031 |
| 2021/0374194 A1* | 12/2021 | Aher | G06F 16/908 |

OTHER PUBLICATIONS

International Preliminary Report on Patentability for International Application No. PCT/US2021/056390, dated May 19, 2023, 9 pages.

\* cited by examiner

Version 502

Version 504

Version 602

Version 604

SYSTEMS AND METHODS FOR GENERATING DEVICE-IDENTIFYING DIGITAL CONTENT ON SOCIAL MEDIA PLATFORMS

CROSS REFERENCE TO RELATED APPLICATION

This application claims the benefit of U.S. Provisional Application 63/110,835, filed 6 Nov. 2020, the disclosure of which is incorporated, in its entirety, by reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
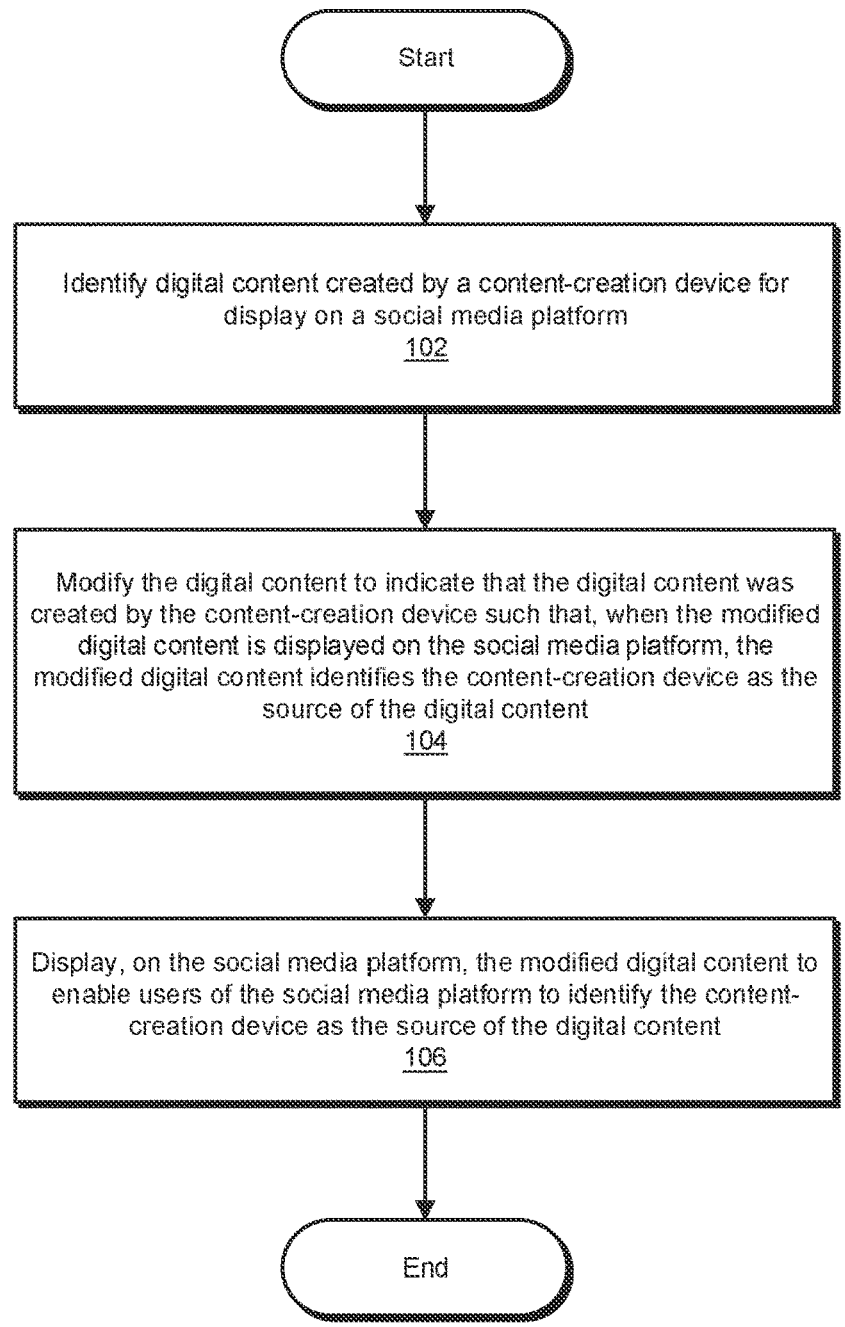
FIG. 1 is a flow diagram of an exemplary method for generating device-identifying digital content on social media platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods for displaying social media content (e.g., video, images, etc.) created by a specific content-creation device in such a way that it is apparent that the content was created by the content-creation device. For example, a video or image may be displayed with a specific border, watermark, overlay, icon, hashtag, or some other visual indicator that the video or image was created with the device. In some examples, a digital picture or illustration of the device itself may be included in the video or image. Additionally or alternatively, a video or image may be displayed with a certain style or signature look and feel, such as high saturation or high contrast, that is associated with videos or images created with the device.

As will be explained in greater detail below, embodiments of the instant disclosure may improve the functioning of a computing device by improving the computing device's ability to digitally modify digital content in ways that are difficult or impossible to perform manually. Additionally, embodiments of the instant disclosure may improve a computing device's ability to meaningfully organize and display device-centric data.

The following will provide, with reference to FIG. 1, detailed descriptions of computer-implemented methods for generating device-identifying digital content on social media platforms. Detailed descriptions of corresponding example systems will be provided in connection with FIGS. 2-3. Detailed descriptions of corresponding digital content displays will also be provided in connection with FIGS. 4-9 and of a corresponding content-creation device in connection with FIG. 10.

Figure 2:
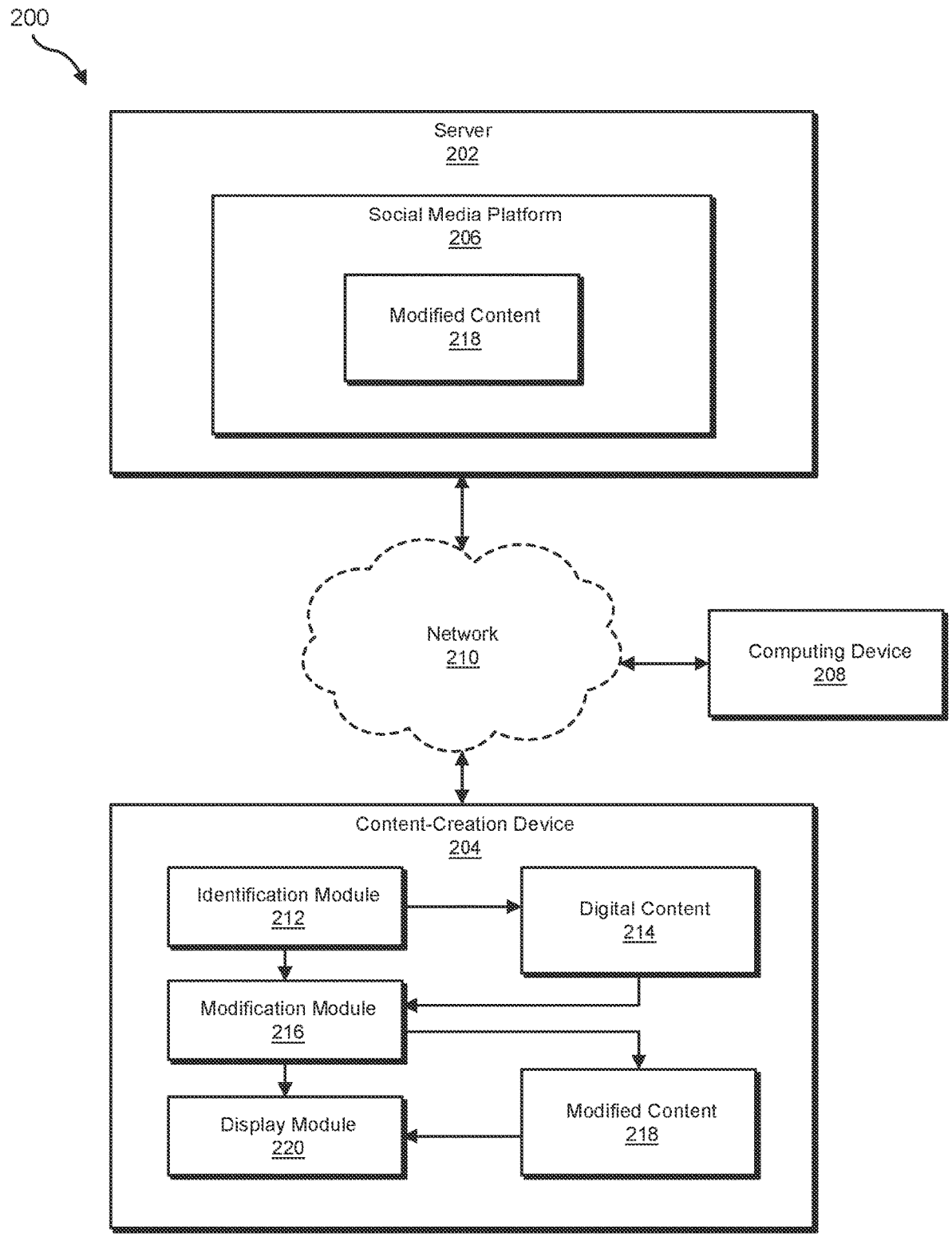
FIG. 2 is a block diagram of an exemplary system for generating device-identifying digital content on social media platforms via a content-creation device.
Figure 3:
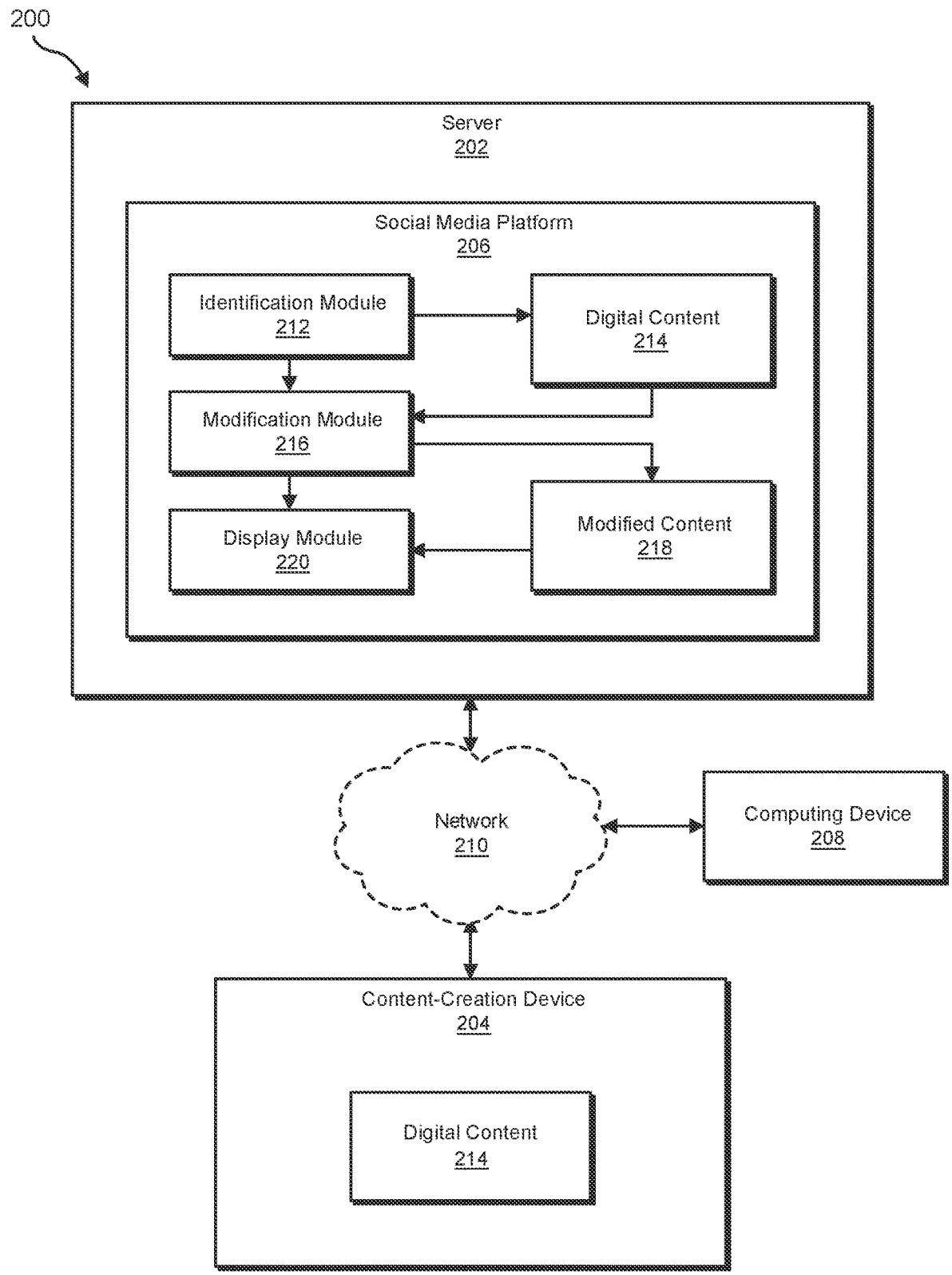
FIG. 3 is a block diagram of an exemplary system for generating device-identifying digital content on social media platforms via a server.

FIG. 1 is a flow diagram of an exemplary computer-implemented method 100 for generating device-identifying digital content on social media platforms. The steps shown in FIG. 1 may be performed by any suitable computer-executable code and/or computing system, such as the systems described herein. For example, the steps shown in FIG. 1 may be performed by modules operating in a server 202 and/or modules operating in a content-creation device 204 (e.g., as shown in exemplary system 200 in FIGS. 2 and 3). In some examples, the steps shown in FIG. 1 may be performed by modules operating primarily on content-creation device 204 (as shown in FIG. 2), modules operating primarily on server 202 (as shown in FIG. 3), or modules operating on a combination of content-creation device 204 and/or a server 202 (e.g., any combination of FIGS. 2 and 3). In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at enabling digital social networking. In some examples, server 202 may perform social networking functions for and/or in conjunction with a social media platform 206. Although illustrated as a single entity, server 202 may broadly represent any physical or virtual server and/or group of physical and/or virtual servers connected by one or more networks.

Social media platform 206 generally refers to any type or form of digital architecture, provided via server 202, that enables digital social networking. In some examples, social media platform 206 may host digital social media content and may provide, via server 202, one or more status-broadcasting services that enable users to upload, broadcast, consume, and/or digitally respond to social media content (e.g., to digital social media compositions). For example, social media platform 206 may provide a newsfeed service and/or a story-feed service. Additionally or alternatively, social media platform 206 may provide one or more messaging services that enable users to exchange digital messages privately.

The term "newsfeed" may generally refer to any type or form of social media consumption channel that presents a scrollable collection of newsfeed compositions (e.g., within a newsfeed interface). The newsfeed may scroll (e.g., upward and/or downward) to reveal different newsfeed compositions posted to the newsfeed, in response to receiving user scrolling input. In one example, a scrollable collection may be curated to a particular user to include newsfeed compositions created by users associated with the particular user (e.g., friends of the particular user and/or users being digitally followed by the user) and/or newsfeed compositions predicted to be of interest to the particular user. The term "newsfeed composition" generally refers to any type or form of digital content that may be displayed in a newsfeed. Newsfeed compositions may include, without limitation, text-based compositions, media-based compositions, which may include either a single media item or a collage of multiple media items, and/or reference-based compositions (e.g., with a link to an online article).

The term "story-feed" may generally refer to any type or form of social media consumption channel that presents a continuous series of digital story compositions to a story-consumer, one by one (e.g., within a story-feed interface). In one example, a story consumption channel may transition from presenting one digital story composition to the next automatically, without requiring any user input to do so. In some examples, a digital story composition may be ephemeral (that is, the digital story composition may only be viewable for a predetermined amount of time). For example, a digital story composition may be set to disappear after twenty-four hours. The term "digital story composition" may generally refer to any type or form of digital social media content intended for a story consumption channel. A digital story composition may include a variety of content (e.g., a digital photograph, a graphic, text, a digital video and/or a digital recording of a music composition). In some examples, digital story compositions from a same source (e.g., created and posted by a same user) may be grouped together within a story consumption channel, such that each digital story composition from a particular source is displayed prior to displaying digital story compositions from another source.

Figure 10:
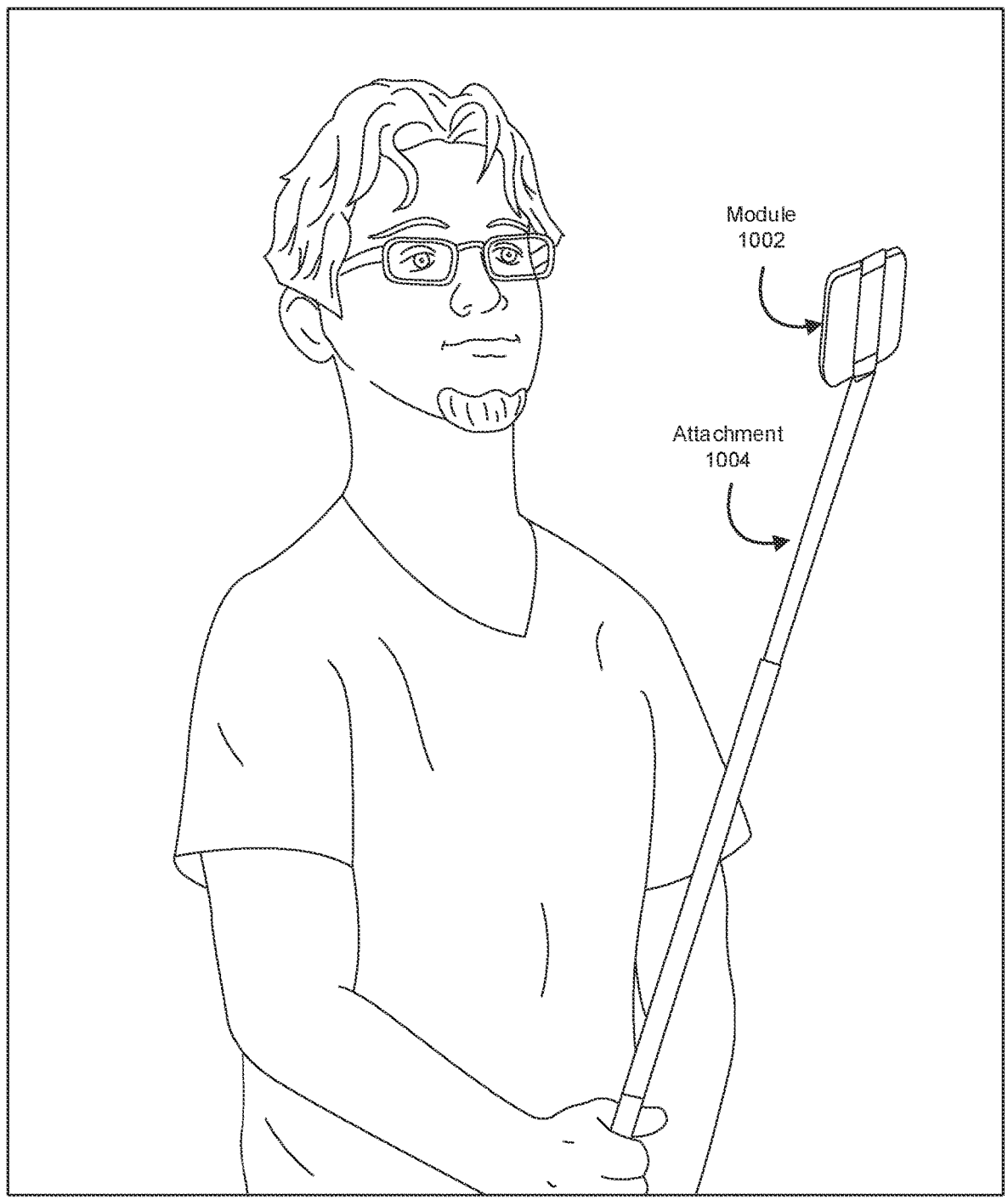
FIG. 10 is an illustration of an exemplary content-creation device coupled to an attachment.

Content-creation device 204 generally represents any type or form of user device capable of creating digital content. In some embodiments, content-creation device 204 may display a graphical user interface (GUI) (e.g., provided via server 202) that enables a user to create, upload, view, and/or interact with digital social media content on social media platform 206. In some embodiments, content-creation device 204 may be a purpose-built device (e.g., for creating content) rather than, or in addition to, a general-purpose computing device. In one such embodiment, content-creation device 204 may be configured with a special-purpose operating system and/or one or more applications geared toward creating and/or sharing digital content to a particular platform (e.g., social media platform 206). In some embodiments, content-creation device 204 may include a computing module that is capable of being coupled to any of a variety of attachments (e.g., a watch strap, a necklace cord, a helmet mount, a selfie stick, a vehicle mount, a backpack, and/or any other appropriate attachment). FIG. 10 provides an illustration of an exemplary embodiment in which content-creation device 204 includes a module 1002 that may be coupled to a selfie stick attachment 1004.

In some examples, a user of content-creation device 204 may have a user account that is registered with social media platform 206 and may have installed an instance of a social media application that operates as part of social media platform 206 (e.g., that enables access to services provided by social media platform 206 via server 202). In addition, or as an alternative, to having the social media application installed, content-creation device 204 may be designed with an operating system inherently configured to store data to and/or display data from social media platform 206. Additionally or alternatively, content-creation device 204 may have installed a browser that navigates to one or more webpages maintained by social media platform 206 that enables access to the platform's services.

In some examples, server 202 may serve content created via content-creation device 204 (e.g., uploaded to server 202 from content-creation device 204), and/or a modified version of such content, to an additional user device (e.g., a computing device 208) to be viewed by an additional user (e.g., via a display element of a computing device 208). In one such example, the content may be displayed to the additional user within a social media consumption interface (e.g., a newsfeed interface and/or story-feed interface) maintained by server 202. The social media consumption interface may be provided via a social media application and/or a browser installed on computing device 208. Computing device 208 generally represents any type or form of computing device capable of reading computer-executable instructions (e.g., a smart phone, a tablet, a laptop, a desktop, a wearable device, a personal digital assistant (PDA), an additional content-creation device, etc.). In some embodiments, content-creation device 204 and/or computing device 208 may communicate with server 202 via a network 210 (e.g., a local area network, a cellular network, and/or the Internet).

Returning to FIG. 1, at step 102, one or more of the systems described herein may identify digital content created by a content-creation device for display on a social media platform. For example, as illustrated in FIGS. 2 and 3, an identification module 212 may identify digital content 214 created by content-creation device 204 for display on social media platform 206. In some examples, identification module 212 may operate as part of content-creation device 204, as illustrated in FIG. 2. Additionally or alternatively, identification module 212 may operate as part of server 202, as illustrated in FIG. 3.

Digital content 214 generally refers to any content, in the form of digital data, that is created via content-creation device 204. In some embodiments, digital content 214 may represent or include digital media captured via one or more sensors of content-creation device 204, such as a camera, microphone, and/or a touchscreen. In some examples, digital content 214 may include content that is recorded from the external world (e.g., a photograph or video). Additionally or alternatively, digital content 214 may represent and/or include content that is created entirely on a computing device (e.g., a digital painting or animation). Examples of digital content 214 may include, without limitation, images, video, and/or audio recordings. In some examples, digital content 214 may represent and/or include user-generated text (e.g., a caption, text post, and/or text-based digital sticker) created via content-creation device 204 (e.g., via input to a touchscreen) and/or metadata (e.g., a time and/or location associated with digital content 214 that is supplied via content-creation device 204 or automatically collected by content-creation device 204).

Identification module 212 may identify digital content 214 in response to a variety of triggers, based at least partially on the device that hosts identification module 212. For example, in embodiments in which identification module 212 is hosted on content-creation device 204, identification module 212 may identify digital content 214 as digital content 214 is being created (e.g., by creating digital content 214 and/or in response to the content being created). As a specific example, identification module 212 may identify digital content 214 by recording digital content 214 via a camera of content-creation device 204 and/or in response to detecting that a recording has been initiated.

In some embodiments, identification module 212 may be configured to automatically identify all content created via content-creation device 204 as intended for display on social media platform 206. Alternatively, identification module 212 may be configured to automatically identify only specific types of digital content as intended for display on social media platform 206. As a specific example, content-creation device 204 may be capable of recording map routes, biometric data, images, videos, and/or audio. In this specific example, identification module 212 may be configured to automatically identify images and/or video as intended for display on social media platform 206 but to not automatically identify map routes, biometric data, or audio as intended for display on social media platform 206.

In addition, or an alternative, to embodiments in which identification module 212 automatically identifies digital content 214, identification module 212 may identify digital content 214 in response to receiving manual user input (e.g., received at content-creation device 204) designating digital content 214 as intended for display on social media platform 206. In these examples, content-creation device 204 may enable a user to designate content stored on content-creation device 204 (e.g., on a hard drive or other memory) as intended for display on social media platform 206 (e.g., by selecting the content for inclusion in a social media composition). Additionally or alternatively, content-creation device 204 may enable a user to designate content at the initiation of a content creation process. As a specific example, content-creation device 204 may provide a camera interface via a display element of content-creation device 204 that presents a selectable element that a user may digitally check (e.g., via input to a touchscreen) to designate an image and/or video captured via the camera interface as intended for display on social media platform 206. In one embodiment, a user may be presented with a toggle element that enables the user to toggle between two choices (e.g., sharing content to social media platform 206 or not sharing). In some examples, the systems described herein may present a user with options to share content to one or more of multiple platform channels (e.g., a stories channel, a newsfeed channel, a private messaging channel, etc.).

In examples in which identification module 212 is hosted by server 202, identification module 212 may also identify digital content 214 in response to a variety of triggers. For example, identification module 212 may identify digital content 214 in response to detecting that digital content 214 has uploaded to server 202. In some such examples, digital content 214 may have uploaded directly from content-creation device 204. In other examples, the content may have uploaded from content-creation device 204 to an additional user device (e.g., a laptop) before being uploaded to server 202. Server 202 (e.g., social media platform 206) may determine that uploaded content was created by content-creation device 204 based on a variety of criteria. For example, in examples in which content is uploaded directly from content-creation device 204, server 202 may determine that the content was created by content-creation device 204 based on having received the content from content-creation device 204. Additionally or alternatively, server 202 may use metadata embedded in content and/or features of content (e.g., file format, file size, aspect ratio, etc.) to identify content-creation device 204 as the source of the content.

At step 104, one or more of the systems described herein may modify the digital content to indicate that the digital content was created by the content-creation device such that, when the modified digital content is displayed on the social media platform, the modified digital content identifies the content-creation device as the source of the digital content. For example, a modification module 216 may, as part of server 202 and/or content-creation device 204 in FIGS. 2 and 3, modify digital content 214 to indicate that digital content 214 was created by content-creation device 204 (i.e., resulting in modified content 218) such that, when modified content 218 is displayed on social media platform 206, modified content 218 identifies content-creation device 204 as the source of digital content 214.

In some examples, as illustrated in FIG. 2, digital content 214 may be modified on content-creation device 204. Additionally or alternatively, digital content 214 may be modified on server 202, as illustrated in FIG. 3. In examples in which digital content 214 is modified on content-creation device 204, modification module 216 may modify digital content 214 as digital content 214 is being created (e.g., recorded). Additionally or alternatively, modification module 216 may modify digital content 214 after digital content 214 has been created and stored on content-creation device 204 but prior to being transmitted to other devices (e.g., to server 202 and/or to an additional user device such as a laptop). In one such example, modification module 216 may modify digital content 214 in response to detecting that a transmission process for transmitting digital content 214 to another device has been initiated.

In examples in which digital content 214 is modified on server 202, modification module 216 may modify digital content 214 in response to a variety of triggers (e.g., in response to receiving digital content 214 from content-creation device 204 and/or an additional device, in response to determining that digital content 214 was created by content-creation device 204, and/or in response to receiving user input requesting the modification). In some embodiments, server 202 may store a list of one or more authorized (e.g., partnered) content-creation devices for which to modify content (e.g., a list of brands and/or device models). In these embodiments, modification module 216 may block non-authorized devices from uploading content that has been modified to indicate that the content was created by an authorized content-creation device. Additionally or alternatively, modification module 216 may prevent non-verified content (i.e., that has not been determined to be created by an authorized content-creation device and/or that has been determined to be created by a non-authorized content-creation device) from being displayed on social media platform 206 (e.g., by blocking the display of such content and/or reversing modifications to such content).

Modification module 216 may modify digital content 214 in any distinctive and discernable manner that signals that digital content 214 was created by content-creation device 204. In some embodiments, modification module 216 may modify digital content 214 by adding a visual indicator to digital content 214. The visual indicator may take a variety of forms. In some examples, the visual indicator may take the form of a digital border (e.g., a digital frame) for digital content 214 (e.g., placed over and/or around digital content 214) and/or a modification to an existing border of digital content 214. In some examples, the border may have a distinctive shape applied to corners of digital content 214 (e.g., rounded corners, corners with a spiked appearance, etc.). Additionally or alternatively, the border may have a distinctive shape (e.g., a wavy and/or jagged conformation) and/or include a distinctive effect (e.g., a shadow effect and/or a 3D effect) applied around the entire perimeter of digital content 214. In some examples, the border may have the appearance of a digital picture frame.

Figure 4:
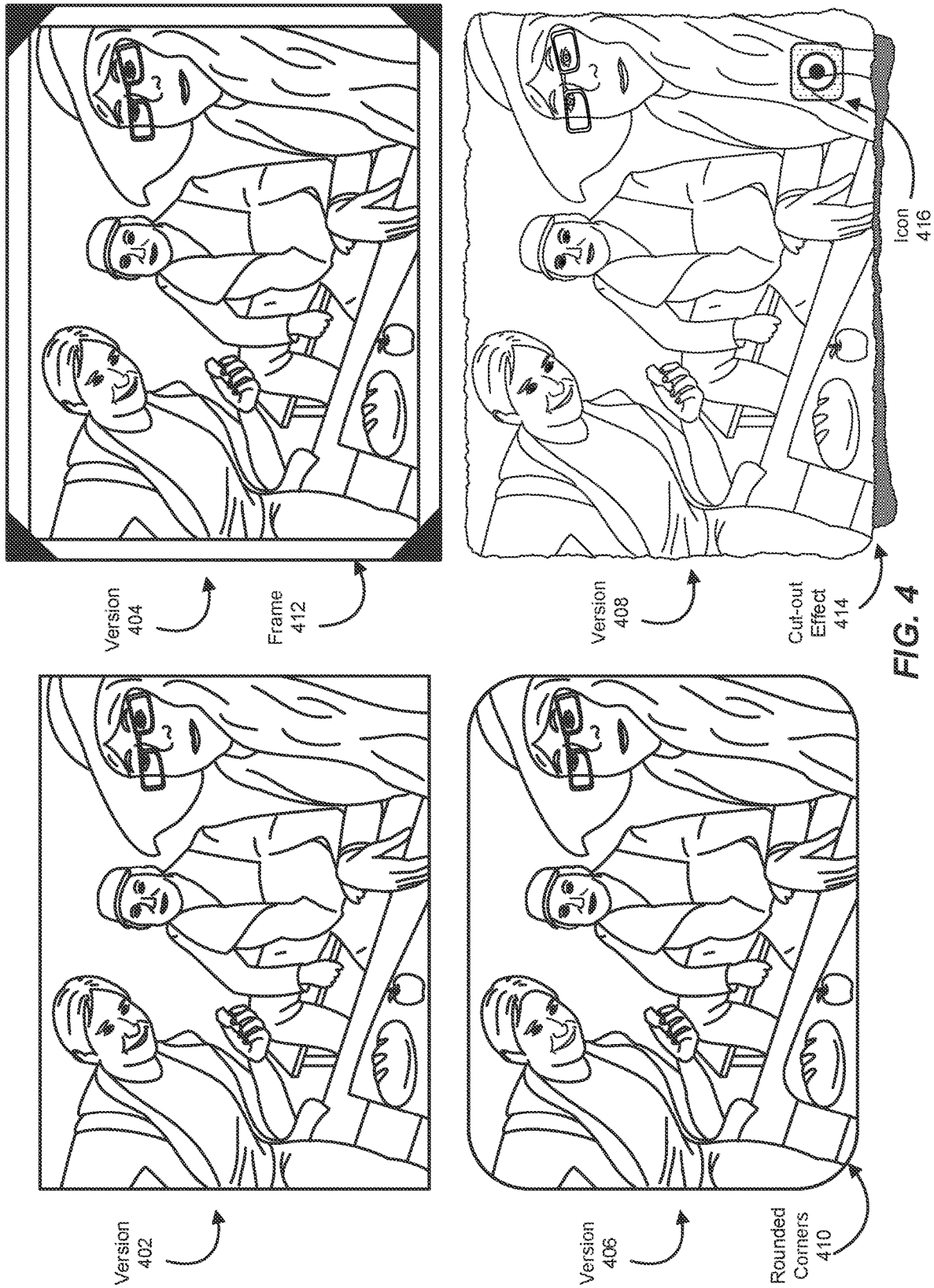
FIGS. 4-9 are illustrations of various digital modifications that may be applied to digital content to indicate a device that created the digital content.
Figure 5:
Figure 5:
Figure 6:
Figure 6:

FIG. 4 depicts three exemplary borders that may be applied to a version 402 of digital content 214, in which unmodified digital content 214 is an image or video with a plain rectangular border. First, a version 404 of modified content 218 includes a border with rounded corners 410 (rather than the square corners of the original version 402). Second, a version 404 of modified content 218 includes, as a border, a digital picture frame 412 that is placed around the perimeter of the image or video and that partially covers the image or video in the corners. Third, a version 408 of modified content 218 includes a border with a cut-out effect 414, which gives the content ragged edges and a drop-shadow.

In addition or as an alternative to a border, in some embodiments, the visual indicator may include or represent a digital icon. The digital icon may take any form. In some examples, the digital icon may visually depict content-creation device 204 and/or a logo associated with content-creation device 204. The digital icon may be opaque and/or semi-transparent. In some embodiments, a digital icon may have a fixed size and/or position within an image and/or video corresponding to digital content 214. Returning to FIG. 4 for a specific example, version 408 includes an exemplary icon 416 associated with content-creation device 204. In additional or alternative examples, the visual indicator may represent a hashtag added to digital content 214 (e.g., a hashtag with a product name of content-creation device 204) and/or a watermark added to digital content 214.

In certain embodiments, modification module 216 may modify digital content 214 by applying a visual filter to digital content 214. The visual filter may represent any type or form of digital overlay (e.g., a semi-opaque color or array of colors and/or a semi-opaque image to be applied over the face of digital content 214). In some examples, the visual filter may overlay the entire face of digital content 214. In other examples, the visual filter may only overlay certain portions and/or elements. In some embodiments, the visual filter may represent a distortion filter configured to warp, twist, and/or otherwise skew a display of digital content 214. Using FIG. 5 as a specific example, modification module 216 may apply a wide-angle distortion filter to a version 502 of digital content 214 to create a warped version 504 of digital content 214.

In some examples, modification module 216 may modify digital content 214 by altering hue values, saturation values, and/or a visual contrast of some or all of the pixels in digital content 214. Using FIG. 6 as a specific example, an original version 602 of digital content 214 may be an image or video with a range of values across the spectrum from light to dark. In this specific example, modification module 216 may have modified digital content 214 to create a version 604 that is high-contrast, with a designated range of values that includes only very light or very dark values. As another specific example, modification module 216 may modify digital content 214 by increasing the saturation of colors within digital content 214 to create a high-saturation version of digital content 214. In a related embodiment, modification module 216 may increase or decrease the saturation of a designated subset of colors rather than modifying the saturation of every color equally. For example, modification module 216 may modify digital content 214 such that the cool colors (e.g., blue, green, etc.) are hyper-saturated in comparison to the warm colors (e.g., red, yellow, etc.) or vice versa. In modifying the colors of an image or video in such a way, modification module 216 may create a distinctive style of content that enables a visual association between the style and content-creation device 204.

Figure 7:
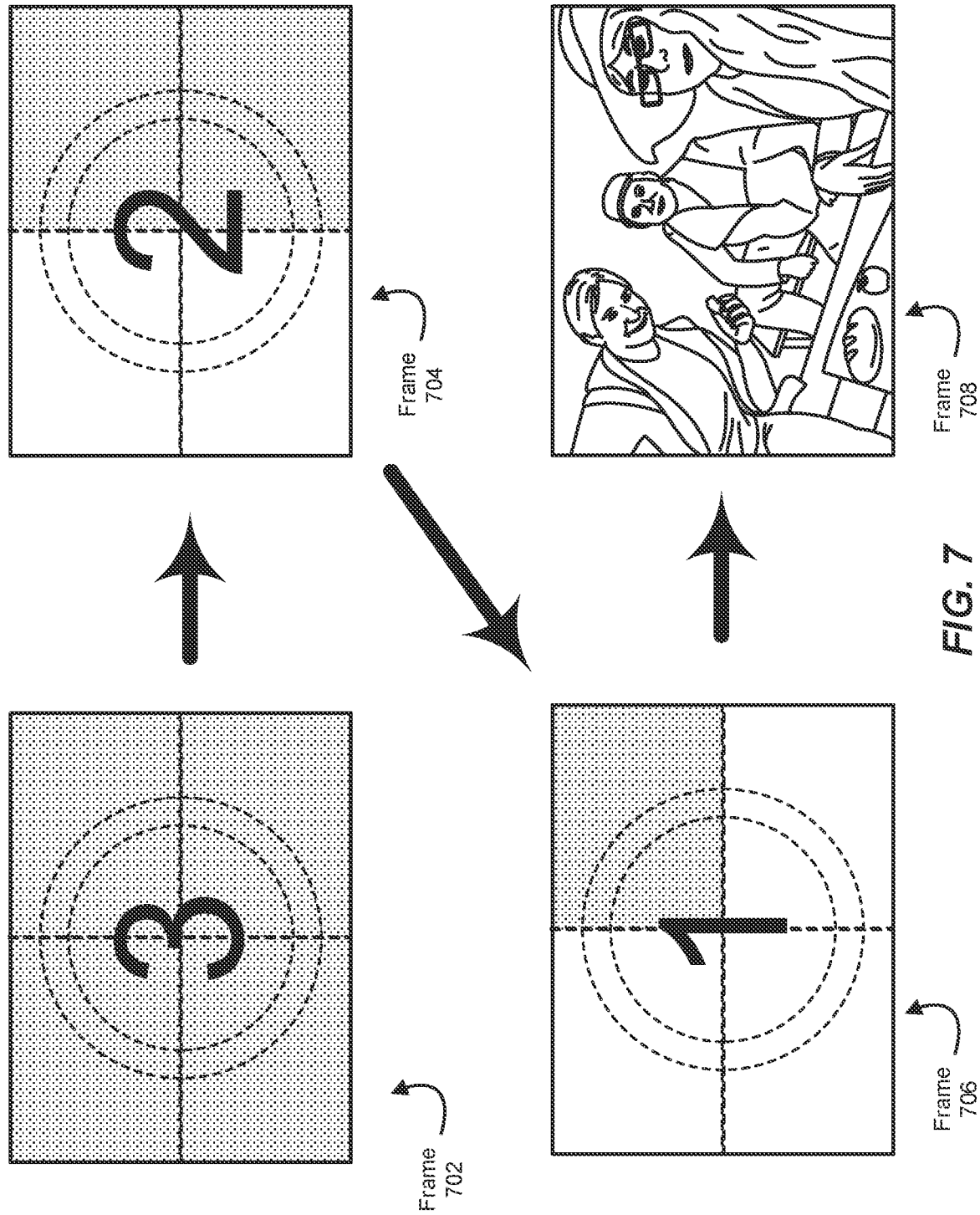
Figure 8:
Figure 8:

In some embodiments, modification module 216 may modify digital content 214 by adding content (e.g., an image, graphic, animation, and/or video) to be displayed in a stream of frames prior and/or following a display of a frame that includes digital content 214. Turning to FIG. 7 as a specific example, modification module 216 may add frames 702, 704, and 706 to a stream to be displayed prior to a frame 708 with digital content 214.

In one embodiment, modification module 216 may modify digital content 214 to emphasize a particular object depicted within digital content 214. Modification module 216 may emphasize the particular object in any way that draws attention to the object (e.g., changing a color of the object within digital content 214, changing a contrast, brightness, and/or saturation of the object within digital content 214, including the object in a hashtag and associating the hashtag with digital content 214, adding a visual element to digital content 214, such as an arrow graphic, that directs attention to the object, etc.). In some examples, the particular object being emphasized may be content-creation device 204. In other examples, the particular object may be an object other than content-creation device 204. Using FIG. 8 as a specific example, modification module 216 may modify a version 802 of digital content 214 to create a modified version 804 in which a loaf of bread (emphasized object 806) has been emphasized by increasing a contrast of the pixels associated with the loaf of bread.

Figure 9:
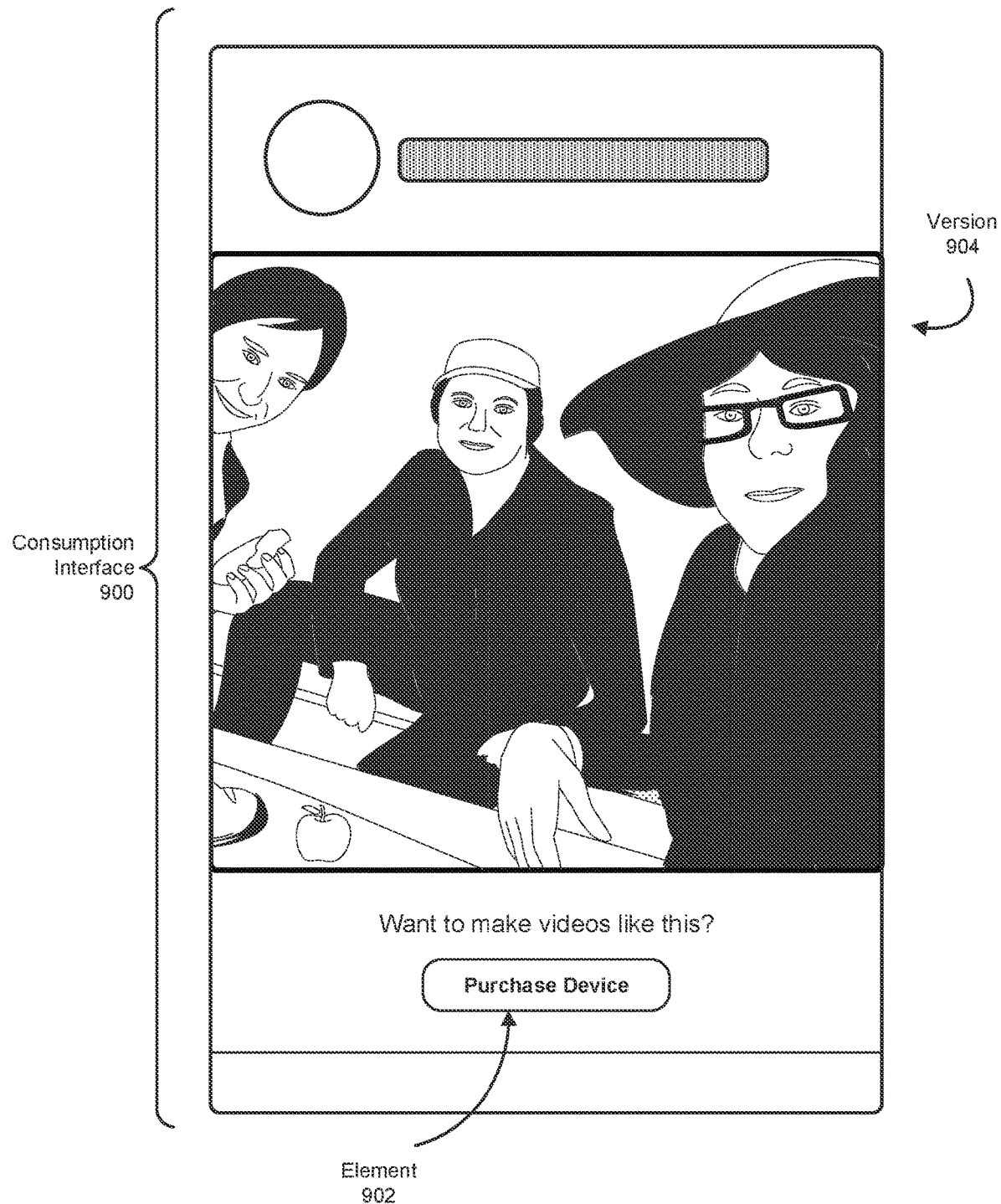

In some embodiments, modification module 216 may modify digital content 214 to include a purchase option associated with a product. For example, modification module 216 may add an embedded uniform resource locator and/or a quick response code to digital content 214 that enable end users viewing modified content 218 to purchase the product in question. FIG. 9 depicts a consumption interface 900 in which a purchase option element 902 is provided along with a version 904 of digital content 214.

A purchase option may enable the purchase of a variety of products. In some examples, the purchase option may enable the purchase of products produced (e.g., manufactured) by a social media entity corresponding to social media platform 206. For example, content-creation device 204 may be produced by the social media entity (e.g., to be used in connection with social media platform 206) and the purchase option may enable the purchase of content-creation device 204, as illustrated in FIG. 9. Additionally or alternatively, the purchase option may enable the purchase of third-party products associated with a content creator of digital content 214 (e.g., products being produced and/or promoted by the content creator). In some embodiments, a purchase option may enable the purchase of an emphasized object (e.g., such as the emphasized object described in connection with FIG. 8).

In embodiments in which the content creator is not the producer of a product available via a purchase option, the purchase option may enable purchasing of the product in line with a variety of distribution and incentive structures. In some examples, the purchase option may enable directly purchasing the product from an entity producing (e.g., manufacturing) the product. As a specific example, a purchase option may enable end users to purchase an instance of content-creation device 204 from a social media entity corresponding to social media platform 206. Additionally or alternatively, the purchase option may enable purchasing the product from the content creator (via, e.g., direct fulfillment or a purchase order) in line with a predetermined arrangement between the content creator and a producer of the product.

In some examples, social media platform 206 may enable all content creators to add a purchase option to content (e.g., within a social media post) to sell and/or distribute products via the purchase option. In other examples, only designated content creators may be enabled to do so (e.g., content creators with a threshold number of followers and/or who have a designated seller account with social media platform 206). In one embodiment, all products may be sold via the purchase option. In other embodiments, only designated products may be sold via the purchase option. For example, only products associated with social media platform 206 may be sold via the purchase option.

In certain embodiments (e.g., in which the product associated with the purchase option is produced by a social media entity corresponding to social media platform 206), the content creator may receive a portion of any profits resulting from eventual viewers of digital content 214 purchasing the product, as an incentive for producing such content. In some cases, the profit shared with the content creator may depend on the content creator's method of involvement in distribution (e.g., content creators may receive higher profits in return for handling inventory/distribution but lower profits for sales/referrals or purchase orders).

In some examples, a profit-sharing arrangement may be available to all content creators. Alternatively, only content creators that satisfy a threshold (e.g., who have a threshold number of followers) may be enabled to sell, refer, and/or distribute the product for a portion of the profits. In some examples, content creators may be used as a sole or primary method of marketing, selling, and/or distributing a product to end users. These approaches may provide end users with trusted, curated experiences highlighting products of interest, benefiting creators, users, and social media platform 206. In some embodiments, social media platform 206 may facilitate a counsel of creators to meet to discuss improvements to social media platform 206 (e.g., to ameliorate systems for highlighting products of interest) that would further benefit creators, users, and social media platform 206.

In embodiments in which there are multiple authorized content-creation devices, modification module 216 may, in some embodiments, modify content differently for the different authorized content-creation devices. For example, modification module 216 may insert an icon unique to each brand and/or model of a content-creation device into content created by devices of that brand and/or model. Additionally or alternatively, the social media platform may use different filters, apply different transformations, and/or otherwise apply different modifications to content from different content-creation devices (e.g., from different brands and/or models of a content-creation device). Modification module 216 may modify content using a variety of automated techniques (e.g., executed on a user device such as content-creation device 204 and/or a server such as server 202). In some examples, modification module 216 may modify content by overwriting a portion of the content.

Returning to FIG. 1, at step 106, one or more of the systems described herein may display, on the social media platform, the modified digital content to enable users of the social media platform to identify the content-creation device as the source of the digital content. For example, a display module 220 may, as part of server 202 and/or content-creation device 204 in FIGS. 2 and 3, display, on social media platform 206, modified content 218 to enable users of social media platform 206 to identify content-creation device 204 as the source of digital content 214.

Display module 220 may display modified content 218 in a variety of ways. In embodiments in which display module 220 operates at least partially on content-creation device 204, display module 220 may display modified content 218 by uploading digital content 214 and/or modified content 218 from content-creation device 204 to social media platform 206 (e.g., via a network such as network 210). Additionally or alternatively, display module 220 may transmit digital content 214 and/or modified content 218 to an intermediary device (e.g., via a physical cable, near field communication, and/or a network) that may then upload digital content 214 and/or modified content 218 to social media platform 206. For example, display module 220 may transmit digital content 214 and/or modified content 218 to a personal computer, operated by the user of content-creation device 204, on which the user may edit digital content 214 and/or modified content 218 (e.g., cropping an image, cutting a video, etc.) before uploading the edited content to social media platform 206.

Additionally or alternatively, in embodiments in which display module 220 operates at least partially on server 202, display module 220 may display modified content 218 by hosting modified content 218 on one or more servers associated with social media platform 206 (e.g., server 202) and making the hosted modified content visible to users and/or viewers of social media platform 206. In some such examples, display module 220 may present modified content 218 within a consumption interface of social media platform 206, which may be displayed to a user (e.g., a user following the user of content-creation device 204) via a display element of a computing device such as computing device 208. For example, display module 220 may display modified content 218 as a post within a digital content feed of social media platform 206, such as a digital newsfeed and/or a story-feed, that presents digital content created by users of social media platform 206. Additionally or alternatively, display module 220 may enable modified content 218 to be embedded into authorized external web pages and/or apps not directly maintained by social media platform 206.

In examples in which modified content 218 includes a purchase option associated with a product (e.g., content-creation device 204 and/or an additional product), the content creator of the content may receive a portion of any profits resulting from viewers of the content purchasing the product of interest. The profit shared with the content creator may depend on the creator's method of involvement in distribution (e.g., whether the creator handles inventory/distribution), as described above in connection with step 104.

As described above, the systems and methods described herein may provide end users of a social media platform with trusted, curated social media experiences highlighting products of interest, benefiting creators, end users, and the social media platform. In some examples, a digital indicator (e.g., modification) may signal that content was created by a particular device or type of device configured to facilitate the creation of social media content. Additionally or alternatively, a digital purchase option may be included (e.g., alongside such a digital indicator) that enables the purchase of the particular device and/or an additional product.

EXAMPLE EMBODIMENTS

Example 1: A computer-implemented method may include (1) identifying digital content created by a content-creation device for display on a social media platform, (2) automatically modifying the digital content to indicate that the digital content was created by the content-creation device such that, when the modified digital content is displayed on the social media platform, the modified digital content identifies the content-creation device as the source of the digital content, and (3) displaying, on the social media platform, the modified digital content to enable users of the social media platform to identify the content-creation device as the source of the digital content.

Example 2: The computer-implemented method of example 1, where (1) the steps of the method are performed by the content-creation device and (2) displaying, on the social media platform, the modified digital content includes uploading, by the content-creation device, the modified digital content to the social media platform for display by the social media platform.

Example 3: The computer-implemented method of examples 1-2 where identifying the digital content includes (1) recording the digital content on the content-creation device and/or (2) receiving, at the content-creation device, input from a user of the content-creation device designating the digital content as being for display on the social media platform.

Example 4: The computer-implemented method of examples 1-3 where (1) the steps of the method are performed by a computing device associated with the social media platform, (2) identifying the digital content created by the content-creation device includes (i) receiving, at the computing device associated with the social media platform, the digital content created by the content-creation device and (ii) determining, at the computing device associated with the social media platform, that the content-creation device created the digital content, and (3) displaying, on the social media platform, the modified digital content comprises presenting the modified digital content within a consumption interface of the social media platform.

Example 5: The computer-implemented method of examples 1-4, where the consumption interface includes a scrollable digital content feed that presents digital content created by the users of the social media platform.

Example 6: The computer-implemented method of examples 1-5, where automatically modifying the digital content to indicate that the digital content was created by the content-creation device includes applying a visual filter to the digital content.

Example 7: The computer-implemented method of examples 1-6, where applying the visual filter includes modifying saturation values of the digital content, modifying hue values of the digital content, and/or modifying visual contrast of the digital content.

Example 8: The computer-implemented method of examples 1-7, where automatically modifying the digital content to indicate that the digital content was created by the content-creation device includes adding a visual indicator to the digital content.

Example 9: The computer-implemented method of examples 1-8, where the visual indicator includes a depiction of the content-creation device.

Example 10: The computer-implemented method of examples 1-9, where the visual indicator includes a frame around the digital content, a hashtag within the digital content, and/or an icon within the digital content.

Example 11: The computer-implemented method of examples 1-10, where automatically modifying the digital content includes overwriting a portion of the digital content.

Example 12: The computer-implemented method of examples 1-11, where the method further includes (1) modifying the digital content to emphasize an object other than the content-creation device and (2) displaying, on the social media platform, the modified digital content to present the emphasized object to the users of the social media platform.

Example 13: The computer-implemented method of examples 1-12, where the digital content includes and image and/or a video.

Example 14: The computer-implemented method of examples 1-13, where the content-creation device represents and/or includes a computing module configured to be coupled to any of a variety of attachments.

Example 15: A system that includes at least one physical processor and physical memory including computer-executable instructions that, when executed by the physical processor, cause the physical processor to (1) identify digital content created by a content-creation device for display on a social media platform, (2) automatically modify the digital content to indicate that the digital content was created by the content-creation device such that, when the modified digital content is displayed on the social media platform, the modified digital content identifies the content-creation device as the source of the digital content, and (3) display, on the social media platform, the modified digital content to enable users of the social media platform to identify the content-creation device as the source of the digital content.

Example 16: The system of examples 15-16, where displaying, on the social media platform, the modified digital content includes uploading, by the content-creation device, the modified digital content to the social media platform for display by the social media platform.

Example 17: The system of examples 15-17, where identifying the digital content includes (1) recording the digital content on the content-creation device and/or (2) receiving, at the content-creation device, input from a user of the content-creation device designating the digital content as being for display on the social media platform.

Example 18: The system of examples 15-17, where (1) identifying the digital content created by the content-creation device includes (i) receiving, at a computing device associated with the social media platform, the digital content created by the content-creation device and (ii) determining, at the computing device associated with the social media platform, that the content-creation device created the digital content and (2) displaying, on the social media platform, the modified digital content includes presenting the modified digital content within a consumption interface of the social media platform.

Example 19: The system of examples 15-18, where the consumption interface includes a scrollable digital content feed that presents digital content created by the users of the social media platform.

Example 20: A non-transitory computer-readable medium may include one or more computer-readable instructions that, when executed by at least one processor of a computing device, cause the computing device to (1) identify digital content created by a content-creation device for display on a social media platform, (2) automatically modify the digital content to indicate that the digital content was created by the content-creation device such that, when the modified digital content is displayed on the social media platform, the modified digital content identifies the content-creation device as the source of the digital content, and (3) display, on the social media platform, the modified digital content to enable users of the social media platform to identify the content-creation device as the source of the digital content.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying digital content captured via a sensor of a content-creation device for display as a post on a social media platform;
   modifying the digital content to visually indicate that the digital content was captured the content-creation device such that, when the modified digital content is displayed as the post on the social media platform, the modified digital content visually identifies the content-creation device as the device that captured the digital content; and
   displaying, as the post on the social media platform, the modified digital content to enable users of the social media platform to identify the content-creation device as the device that captured the digital content.

2. The computer-implemented method of claim 1, wherein:
   the steps of the method are performed by the content-creation device; and
   displaying, as the post on the social media platform, the modified digital content comprises uploading, by the content-creation device, the modified digital content to the social media platform for display as the post by the social media platform.

3. The computer-implemented method of claim 2, wherein identifying the digital content comprises recording the digital content on the content-creation device.

4. The computer-implemented method of claim 1, wherein:
the steps of the method are performed by a computing device associated with the social media platform;
identifying the digital content captured via the sensor of the content-creation device comprises:
receiving, at the computing device associated with the social media platform, the digital content captured via the sensor of the content-creation device; and
determining, at the computing device associated with the social media platform, that the content-creation device captured the digital content; and
displaying, on the social media platform, the modified digital content as the post comprises presenting the modified digital content as the post within a consumption interface of the social media platform.

5. The computer-implemented method of claim 4, wherein the consumption interface comprises a scrollable digital content feed that presents, as posts, digital content created by the users of the social media platform.

6. The computer-implemented method of claim 1, wherein modifying the digital content to visually indicate that the digital content was captured by the content-creation device comprises applying a visual filter to the digital content.

7. The computer-implemented method of claim 6, wherein applying the visual filter comprises at least one of:
modifying saturation values of the digital content;
modifying hue values of the digital content; or
modifying visual contrast of the digital content.

8. The computer-implemented method of claim 1, wherein modifying the digital content to visually indicate that the digital content was captured by the content-creation device comprises adding a visual indicator to the digital content.

9. The computer-implemented method of claim 8, wherein the visual indicator comprises a depiction of the content-creation device.

10. The computer-implemented method of claim 8, wherein the visual indicator comprises at least one of:
a frame around the digital content;
a hashtag within the digital content; or
an icon within the digital content.

11. The computer-implemented method of claim 1, wherein modifying the digital content comprises overwriting a portion of the digital content.

12. The computer-implemented method of claim 1, further comprising:
modifying the digital content to emphasize an object depicted within the digital content; and
displaying, on the social media platform, the modified digital content to present the emphasized object to the users of the social media platform.

13. The computer-implemented method of claim 1, wherein modifying the digital content further comprises modifying the digital content to include a purchase option associated with at least one of the content-creation device or an object emphasized within the digital content.

14. The computer-implemented method of claim 1, wherein the content-creation device comprises a computing module configured to be coupled to any of a variety of attachments.

15. A system comprising:
at least one physical processor;
physical memory comprising computer-executable instructions that, when executed by the physical processor, cause the physical processor to:
identify digital content captured via a sensor of a content-creation device for display as a post on a social media platform;
modify the digital content to visually indicate that the digital content was captured by the content-creation device such that, when the modified digital content is displayed as the post on the social media platform, the modified digital content visually identifies the content-creation device as the device that captured the digital content; and
display, as the post on the social media platform, the modified digital content to enable users of the social media platform to identify the content-creation device as the device that capture the digital content.

16. The system of claim 15, wherein displaying, as the post on the social media platform, the modified digital content comprises uploading, by the content-creation device, the modified digital content to the social media platform for display as the post by the social media platform.

17. The system of claim 16, wherein identifying the digital content comprises recording the digital content on the content-creation device.

18. The system of claim 15, wherein:
identifying the digital content captured via the sensor of the content-creation device comprises:
receiving, at a computing device associated with the social media platform, the digital content captured via the sensor of the content-creation device; and
determining, at the computing device associated with the social media platform, that the content-creation device captured the digital content; and
displaying, on the social media platform, the modified digital content as the post comprises presenting the modified digital content as the post within a consumption interface of the social media platform.

19. The system of claim 15, wherein the digital content comprises at least one of image or video.

20. A non-transitory computer-readable medium comprising one or more computer-readable instructions that, when executed by at least one processor of a computing device, cause the computing device to:
identify digital content captured via a sensor of a content-creation device for display as a post on a social media platform;
modify the digital content to visually indicate that the digital content was captured by the content-creation device such that, when the modified digital content is displayed as the post on the social media platform, the modified digital content visually identifies the content-creation device as the device that captured the digital content; and
display, as the post on the social media platform, the modified digital content to enable users of the social media platform to identify the content-creation device as the device that captured the digital content.

* * * * *